July 2, 1968
L. R. YOSS
3,390,743
LIQUID-FILLED RUPTURABLE TUBE BRAKE
Filed Oct. 26, 1966
2 Sheets-Sheet 1
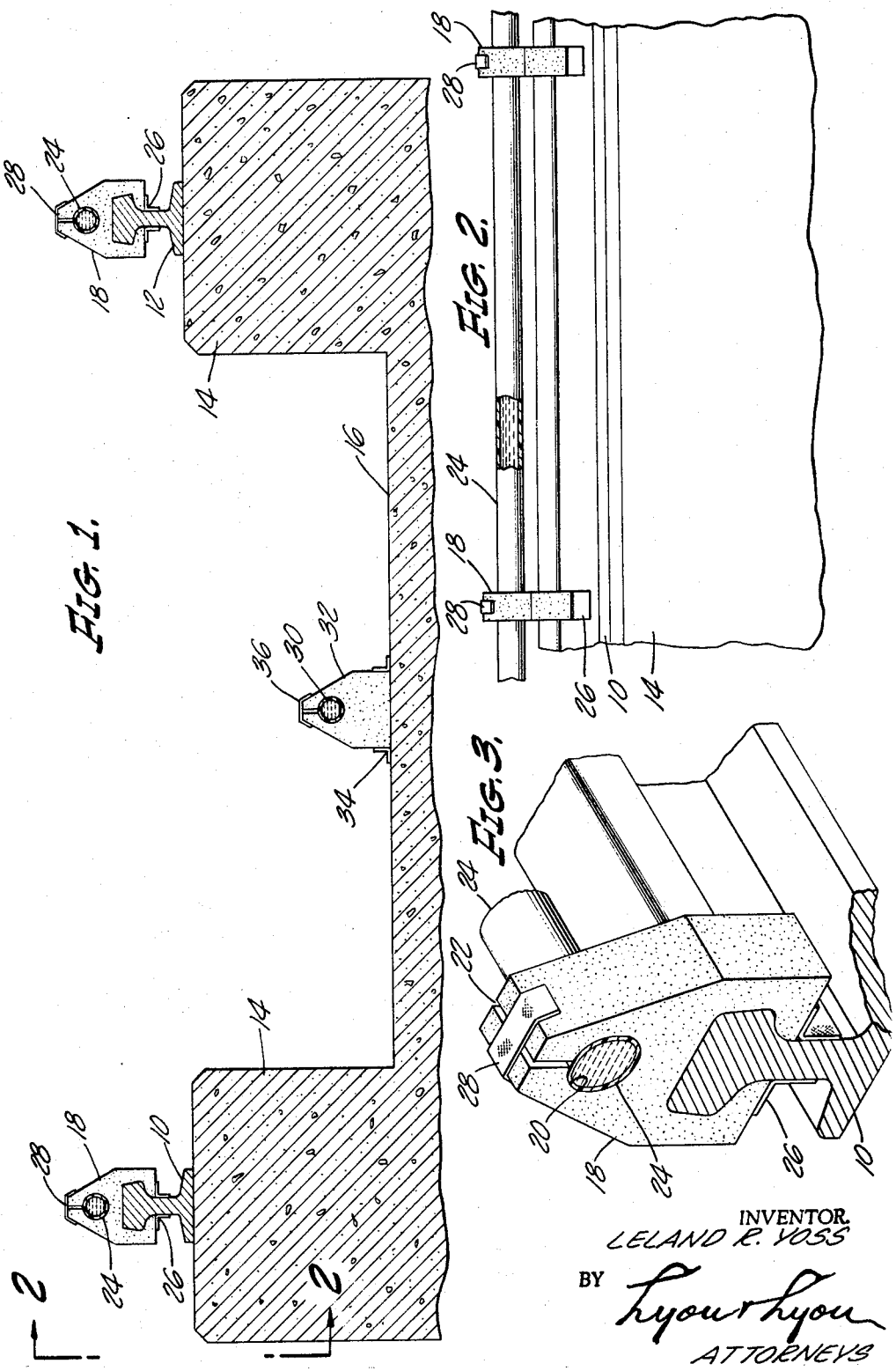
INVENTOR.
LELAND R. YOSS
BY Lyon & Lyon
ATTORNEYS

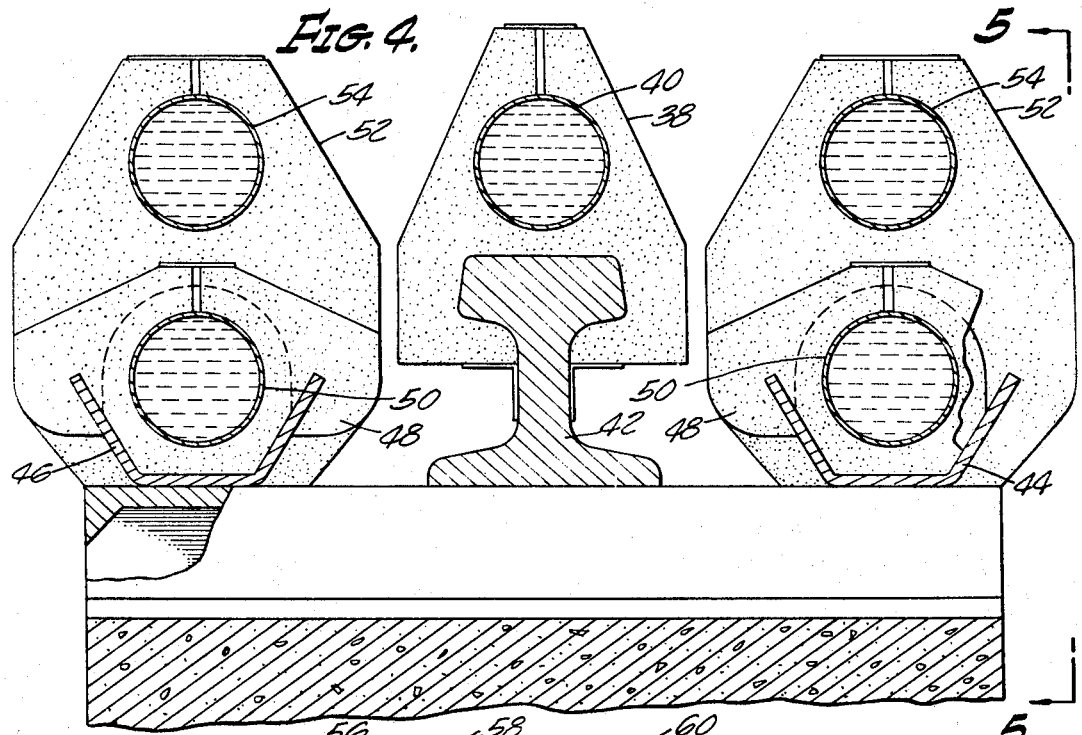

United States Patent Office 3,390,743
Patented July 2, 1968

3,390,743
LIQUID-FILLED RUPTURABLE TUBE BRAKE
Leland R. Yoss, 2572 Harbor Sight Drive,
Rolling Hills, Calif. 90274
Filed Oct. 26, 1966, Ser. No. 589,743
9 Claims. (Cl. 188—38)

This invention relates to a novel means for reducing the forward velocity of a rail-mounted sled-type vehicle.

At the present time rail-mounted sled-type vehicles are utilized for the testing of various types of engines, new methods of seat ejection systems, rocket components, space capsules, guidance systems of all types, and for the study of animals and human beings under the influence of high gravity forces. This is done by placing a sled on one or more tracks, equipping the sled with a group of rocket engines, adding the load to be tested, and igniting the engines. The sled is propelled down the track under a high rate of acceleration for several miles. During this time various on-board instrumentation records the influence of the acceleration on animate or inanimate objects undergoing tests. Thereafter, it is necessary to stop the sled within a relatively short distance. One such method is to provide the sled with a scoop which can be lowered into a water trough positioned alongside of or between the rails of the track. The water trough at the point nearest to the sled as the sled begins to decelerate is relatively shallow. However, along the longitudinal length of the water trough the depth of water is gradually increased to a specified depth. For example, a half inch, an inch or two at a time. Separate compartments containing the water at various depths are maintained by thin Masonite or other type partitions. Thus, as the sled approaches the water trough, the scoop begins to contact the water and the amount of water contact is progressively increased as the length of the trough is traversed. This method of stopping a sled by contact with an open water trough has been found to be quite successful for speeds up to several times the speed of sound. However, more recently it has become necessary to test components and/or living beings wherein there is involved hypersonic speeds on the order of Mach three, four, and even considerably higher. At these speeds, the shock wave produced by the advancing sled has been found to precede the sled thus pushing all or part of the water out of the trough ahead of the sled and thereby reducing the retarding effects of the water. The advancing shock effect can in some cases so diminish the braking action of the water that the sled would then overrun the rails and be destroyed. This not only results in the loss of the sled itself, but also, in some cases, the on-board instrumentation, the recovery of which is essential to the completion of the desired experiment. Accordingly, the present invention is primarily and significantly concerned with an improved means for the braking of a rail-mounted sled.

Therefore, it is a principal object of the present invention to provide a novel means for the braking of a rail-mounted sled.

More specifically, it is an object of the present invention to provide a novel means for braking a rail mounted sled by eliminating the adverse effects on water braking produced by the shock wave which proceeds the sled when traveling at hypersonic speeds.

It is a particular object of the present invention to provide a novel means for braking a rail-mounted sled which is fully operative and effective for reducing the velocity of a sled traveling at speeds on the order of Mach three or higher.

It is also an object of the invention to provide a braking means for a rail-mounted sled which eliminates the need for large open water troughs.

These and other objects and advantages of the present invention will become apparent from the more detailed description which follows, taken in conjunction with the accompanying drawings.

Briefly, the present invention comprises a means for retarding the forward velocity of a rail-mounted sled which comprises positioning in proximity to the rails, but in spaced-apart relationship thereto, and aligned longitudinally therewith one or more elongated thin-walled liquid-filled rupturable tubes, which tubes are adapted to engage the brake force receiving means forming part of or attached to the sled, e.g., scoops, pressure plates, or the like, traveling at high speed along the rails, to utilize the water released by the rupture of the tubing to retard the forward velocity of the sled. These tubes are to be held in place by any type of supports, the supports being made from any suitable material. The supports can be attached to the rail and/or attached at a specified distance from the rail by any means.

It is a significant part of the discovery embodied in the present invention that the shock wave produced by the on-rushing sled traveling at hypersonic speeds does not drive the water away from the front of the sled or out the distant end of the tubing in a manner analogous to that observed to occur in the case of open water troughs. More significantly, it has been found that while the shock wave produced by the sled traveling at hypersonic speed may tend to produce a progressive rupturing of the thin wall tubing containing the fluid in advance of direct physical contact with the sled, the rupture is such that the escape of water takes place generally in a radial direction from the tubing, and hence the water released is available for producing braking action against the scoops or pressure plates on the sled when the sled reaches the rupture point a few milliseconds later. In short, the present invention has been found to eliminate the adverse results on braking that the shock effect on open water, discussed above, would otherwise cause. While not bound by any theory or mechanism of rupture or braking, this is believed to account for the superior braking action at hypersonic speeds produced by the means of the present invention.

The present invention is characterized by several other advantages. Experience has shown that the open water in the troughs tends to attract birds which are difficult to completely eliminate from the site during testing. As a result, on occasion high speed sleds have crashed into one or more birds doing substantial damage to the sled. However, birds are not in any way attracted to the water as it is utilized in the present invention, since the water is contained within a thin wall plastic tubing, and hence is not available for drinking and cannot act as a reflecting pond.

Turning to the drawings:

FIGURE 1 shows a cross-sectional view of the two rails and supporting structures, with the liquid filled longitudinally aligned tubing and its support being shown in cross-section.

FIGURE 2 is a side view taken along the line 2—2 in FIGURE 1.

FIGURE 3 is an enlarged perspective view of a portion of one of the rails shown in cross-section in FIGURE 1 illustrating more clearly the connection of the water filled longitudinally aligned tubing to the rails.

FIGURE 4 is a cross-sectional view of another form of my invention showing a monorail having the tubing supported above the rail and in troughs along side the rail.

FIGURE 5 is a sectional view taken along the line 5—5 in FIGURE 4.

FIGURE 6 is a sled and two pushers with their respective brake force receiving means engaging the tubes shown in FIGURE 4.

FIGURE 7 is a perspective view of a portion of the tubings shown in FIGURE 6.

Turning to the drawings in greater detail, the tracks or rails are indicated generally as 10 and 12 respectively. The sled (not shown) rides on wheels, skids or the like directly on the top surface of tracks 10 and 12. The tracks are supported by the concrete base 14 which contains a center depression or recess 16. Attached to the rails at periodic intervals along the longitudinal length thereof are support members 18. The lower ends of the support members are adapted to fit snugly around the upper enlarged portion of the rails 10 and 12. At the upper end of each of the supports 18 is an opening 20 and a slot 22 to permit the placement therein of the longitudinally aligned fluid containing tubes 24. Thus, by placing a plurality of impact disintegratable supports 18 along the length of the rail lengths of thin wall tubing 24 can be supported and snugly held in the openings 20 to provide an arrangement best shown in FIGURE 2. The supports 18 may be held to the rails by tape 26 or any other suitable retaining or fastening means. This prevents the supports 18 from being blown or knocked off the rails by wind or vibration. The tubes containing the water or other liquid are also held in the openings 20 by overlying adhesive tape or other restraining means 28. This prevents the tube from being jostled out of the openings 20 due to vibration or other disturbances.

The sled utilized in the practice of this invention, including the attachment of scoops and pressure plates thereto, is already totally familiar to those skilled in the art, and hence the details of the sled need not be described in this patent.

In general, the tubings 24 are in long sections on the order of 500, 1000 feet or more. Thus, any number of these sections may be placed end to end to provide the desired length. By utilizing these long sections, each of which is supported at one, two, three or four foot intervals by the supports 18, or by any other desired distances between supports, the filling of the tubes with water is relatively simple since, for example, by using 1000 foot sections on each rail, only 10 tubes are required to be filled for each mile of double railed track or five tubes for single rail track. Since it is generally preferred to increase the amount of water impinging upon the sled as the sled progresses through the braking cycle, it is possible that the tubes may be of progressively larger diameter as that end of the rails utilized to complete the braking phase is approached. For example, the size of the tube initially contacted by the sled may be on the order of ½ inch in diameter, whereas the water-filled tube most proximate to the end of the braking cycle may be as large as 2 or 3 or more inches in diameter.

An optional form of the invention is also shown in FIGURE 1 wherein the longitudinally aligned water-filled tube 30 is positioned between the rails and is supported by support 32 held in place by adhesive 34. The tube 30 is held in place by adhesive 36. This method of utilizing this optional embodiment of the invention may be either in lieu of or supplemental to the positioning of the water-filled tubes on the rails. In the case where the water-filled tube is positioned between the rails and beneath the level of the rails, of course, it is necessary that the sled be provided with a scoop (not shown) or other underhanging pressure plate to contact the water in the tubes.

Another embodiment is illustrated in FIGURES 4-7. Here, one series of supports 38 and liquid-filled tube 40 are positioned atop rail 42. At sides of rail 42, are troughs 44 and 46. Positioned in the troughs at spaced intervals are low-standing supports 48 and the tubes 50 held thereby, and high-standing supports 52 and associated tubes 54. This arrangement is particularly well adapted for braking the three-unit rail mounted vehicle shown in FIGURE 6 and comprising sled 56 and pushers 58 and 60. The sled 56 is equipped with brake force receiving means 62 adapted to engage tube 40. The pusher 58 has a brake force receiving means 64 to engage tubes 54, and the brake force receiving means 66 on pusher 60 engages tubes 50.

As will be apparent to those skilled in the art, many variations on the invention are possible. For example, the tubings and supports may be positioned on each side of a double railed track. It is also possible to position one or more lengths of tubing between and below the two rails of a double railed track. Many other arrangements will occur to those skilled in the art upon consideration of this disclosure, and hence all such variations are part of my invention.

In operation, after the water-filled tubings have been positioned in the manner shown in the drawings, the sled approaches the thus equipped section of track at high speed. The sled is equipped with pressure plates or scoops positioned either directly above the rails, to either side of the rails, or between the rails and projecting down so as to contact the water-filled tubing. As the impact occurs, the supports for the tubing and the tubing itself are essentially disintegrated by the tremendous force. However, the impacting and disintegration leaves the water in direct contact with the pressure plate or scoops on the sled. The inertia of the water against the sled provides very effective braking action. The supports utilized to hold the tubes in place are normally made of a very lightweight readily disintegratable flexible or rigid foam material, such as the commercially available flexible polyurethane or semi-rigid foam having a density of about one to two pounds per cubic foot. However, the precise composition of the disintegratable support material is not critical. Likewise, the chemical composition of the thin wall plastic tubing is not critical, and polyethylene, polyvinyl chloride, or some similar commonly sold flexible plastic tubing is employed. In general, the supports can be positioned in a manner whereby after the tubing is liquid-filled, the liquid tends to rigidize the tubing and prevent sagging or other deformation.

As can be seen, the present invention provides a novel and improved method for the braking of a rail mounted sled. By the present invention the water is so positioned that it cannot fail to contact the pressure plate or scoops on the sled, hence effective braking action is achieved even when approaching the braking area at hypersonic speeds. The problems previously encountered with the pushing away of the water by the shock wave and the attraction of birds due to open exposed water is eliminated. In addition, the present invention may be practiced utilizing cheap commercially available plastic materials requiring a minimum of labor for installation. By the present invention, the use of elaborate water tight elongated swimming pool type troughs is eliminated. In addition, it is much simpler in the present invention to progressively increase the amount of water present along the length of the trough simply by increasing the diameter of the tubing. In contrast thereto in the prior art, carefully constructed dams had to be prepared in order to provide gradations in the level water in the troughs.

The present invention also reduces the amount of clean-up time and labor following a run. This is of importance since it increases the number of runs which can be carried out per day on any given length of track.

Having fully described the invention, it is intended that it be limited only by the lawful scope of the appended claims.

I claim:

1. A method for retarding the forward velocity of the rail-mounted sled which comprises positioning in proximity to and spaced apart from the rails and aligned longitudinally therewith at least one elongated thin-walled liquid-filled rupturable tubing whereby said tubing is adapted to be contacted by a brake force receiving means on a high speed sled traversing the length of the rails to utilize the liquid in the tubes to retard and brake forward velocity of the sled.

2. The method of claim 1 wherein the tubes are positioned above each of two rails which carry the sled, said tubes being spaced above said rails and supported by, at periodic intervals, light-weight disintegratable support means.

3. The method of claim 1 wherein the tubes are positioned above each of two rails which carry the sled, said tubes being spaced above said rails and supported by, at periodic intervals, light-weight disintegratable polyurethane support means.

4. The method of claim 2 wherein the tubes are arranged in end-to-end fashion and are of larger diameter as that end of the rails utilized to complete the braking phase is approached.

5. The method of claim 1 wherein the tubes are positioned along side the rails in troughs and supported therein at periodic intervals by light-weight disintegratable support means.

6. The method of claim 1 wherein the thin-walled liquid-filled rupturable tubes are positioned between two rails carrying the sled and below the level of the rails.

7. The method of claim 1 wherein the brake force receiving means on the sled is a scoop or pressure plate.

8. The method of claim 2 wherein the supports for the tubing comprise a disintegratable plastic foam material comprising a structure having one end adapted to snugly grip the upper end of a rail and having an opposite end having an opening therein adapted to snugly receive the water-filled tubing.

9. A method for retarding the forward velocity of a rail-mounted sled which comprises positioning in proximity to and spaced apart from the rails and aligned longitudinally therewith a plurality of elongated thin-walled water-filled rupturable tubing arranged in end-to-end fashion, sending a sled along said rails at hypersonic speed, and causing said tubing to be contacted by a brake force receiving means on a high speed sled traversing the length of the rails to utilize the water in the tubes to retard and brake the forward velocity of the sled.

References Cited

UNITED STATES PATENTS 2,724,966 11/1955 Northrop et al.
3,089,669 5/1963 Broudo.

DUANE A. REGER, *Primary Examiner.*